United States Patent [19]

Peterson et al.

[11] Patent Number: 4,837,423
[45] Date of Patent: Jun. 6, 1989

[54] LOW TEMPERATURE KILN

[75] Inventors: Joseph L. Peterson; Robert A. Wilson, both of Salt Lake City, Utah

[73] Assignee: Custom Equipment Corporation, Salt Lake City, Utah

[21] Appl. No.: 115,444

[22] Filed: Oct. 30, 1987

Related U.S. Application Data

[60] Continuation-in-part of Ser. No. 17,470, Feb. 20, 1987, which is a continuation of Ser. No. 794,952, Nov. 1, 1985, abandoned, which is a continuation of Ser. No. 611,147, May 17, 1984, abandoned, which is a division of Ser. No. 381,426, May 24, 1982, Pat. No. 4,462,870.

[51] Int. Cl.⁴ .............................................. F26B 17/16
[52] U.S. Cl. ....................................... 219/390; 34/64; 34/167
[58] Field of Search ............... 219/400, 390, 388, 405, 219/411, 354; 34/64, 65, 165, 167, 177; 432/95, 102; 373/109

[56] References Cited

U.S. PATENT DOCUMENTS

| | | | |
|---|---|---|---|
| 197,464 | 11/1877 | Gratiot | 34/165 |
| 685,336 | 10/1901 | Leroy | 432/102 |
| 884,230 | 4/1908 | Spivak | 219/388 |

Primary Examiner—Teresa J. Walberg
Attorney, Agent, or Firm—Trask, Britt & Rossa

[57] ABSTRACT

A static kiln includes an annular heating zone, the inner wall of which is defined by an approximately cylindrical core. The core and the outer wall of the heating zone are suspended to permit movement due to thermal expansion and contraction. Both the inner and outer walls of the heating zone include structures which transmit heat into a supply chamber so that particulate material introduced to the supply chamber is partially dried prior to entering the heating zone.

11 Claims, 3 Drawing Sheets

LOW TEMPERATURE KILN

RELATED APPLICATIONS

This is a continuation in-part of application Ser. No. 017,470 filed Feb. 20, 1987, which was a continuation of application Ser. No. 794,952 filed Nov. 1, 1985 and now abandoned, which was a continuation of application Ser. No. 611,147 filed May 17, 1984 and now abandoned, which was divisional of application Ser. No. 381,426 filed May 24, 1982, now issued as U.S. Pat. No. 4,462,870.

BACKGROUND OF THE INVENTION

1. Field

This invention relates to kilns, and is directed to a relatively low temperature kiln useful for reactivating carbon.

2. State of the Art

Kilns of various types are in use. Lined kilns are generally operated at very high temperatures to drive moisture, including water of hydration, from substances such as limestone. Activated carbon, after use, is often recycled through an indirect-fired, unlined, rotary kiln for reactivation. Such unlined kilns are of necessity operated at relatively much lower temperatures.

The moving parts of a typical rotary kiln, e.g., the rotating shell, trunnion and thrust roll assembly, drive assembly (consisting of motor, reducer, gears or chain and sprocket), trunnion roll assembly and breeching seals, require servicing, such as lubrication, adjustment of alignment and replacement due to wear or buckling.

Rotary kilns used for the reactivation of carbon are typically about 20 to about 30 inches in diameter and about 20 to about 35 feet in length. Some such kilns are much larger, e.g., 60 inches in diameter and 60 feet long. In any event, they occupy considerable building volume, and provisions for replacement of the rotating shell require the existence of clear space in line with the kiln to allow removal of the shell from its stationary housing.

SUMMARY OF THE INVENTION

The present invention provides a kiln especially adapted to heat particulate materials, notably carbon. Its structure and operation differ significantly from conventional kilns. Its structure permits the movement of material by gravity, thereby eliminating the moving parts characteristic of rotary kilns. It can be operated at temperatures higher than those normally maintained in the unlined rotary kilns currently used to reactivate carbon. These higher temperatures contribute to the method of this invention for reactivating carbon.

The kilns of this invention are constructed of metal, and in most instances are operated without refractory linings in the heating zone. The kiln includes a metallic, solid walled vessel having a wall which substantially surrounds and defines an exterior space. This exterior space forms the heating zone of the kiln. A spacing member (or "core") having solid walls, is mounted reciprocably within the interior space. The association of the spacing member and the vessel wall defines an approximately annular-shaped heating zone therebetween. Being reciprocably mounted, the spacing member is free to be displaced either upwards or downwards in response to forces engendered by thermal expansion of either the material being processed within the kiln or alternately the structure of the kiln itself. The vessel and core may be separately suspended as hanging members, thereby allowing freedom of expansion and contraction of the inner and outer walls of the annular heating zone. Compressive stresses are avoided in this fashion.

A heating means for heating the vessel wall to a selected temperature is mounted outside of the vessel. In one embodiment, this heating means is a plurality of electrical heating coils which may be configured to form a plurality of annular coils encircling the vessel wall. Preferably, the coils are positioned proximate the lower region of that vessel wall whereby that region is heated directly by the coils while the upper region of the wall is to a large extent heated by conduction of heat from the lower wall region. The vessel wall and the spacing member are heated to a high temperature, usually above about 1000° F. but below the softening point of the materials of construction of the vessel wall of the vessel and the spacing member. In this fashion, the annular heating zone is brought up to a selected reaction temperature. A carbon reaction temperature as high as 1500° F. is practical, but more typically, operating temperatures for the reactivation of carbon are selected from within the range of about 1100° to 1250° F.

The annular heating zone is sealed except for an inlet opening at the top of the vessel and an outlet opening at the bottom of the vessel. Being sealed, the heating zone confines gasses, e.g. steam, produced within the zone during reactivation. The presence of these gasses has been found to contribute a positive effect to the reactivation process and greatly increases the rate of that process. Whereas previous reactivation processes and technologies had required the injection of steam or other gasses into the particulate mass during its reactivation, the present process avoids any such requirement.

Means are provided for introducing particulate material to the top of the vessel and for discharging the material from the bottom of the vessel at a controlled rate so that material introduced to the top migrates by gravity down through the heating zone during a selected residence time. In one embodiment, this introduction means includes a supply chamber mounted above the heating zone. Particulate material flows under the force of gravity from the supply chamber into the heating zone.

The supply chamber desirably houses heat transfer structures which deliver heat; e.g., from the walls of the annular heating zone, to the particulate material before it enters the heating zone. The supply chamber then serves as a drying zone whereby the moisture level of the particulate feed may be adjusted to within a desired range. In the case of carbon, which typically contains about thirty to about forty percent water in its deactivated form, it is considered desirable to dry the material to a moisture content of between about ten and about twenty percent by weight prior to its introduction to the heating (reactivation) zone. This amount of moisture produces adequate steam in the heating zone to promote reactivation of the carbon, presumably by cleaning pores in the carbon particles as well as by ensuring the presence of a reducing atmosphere within the heating zone.

As an example of a suitable heat transfer arrangement, that portion of the spacing member (core) positioned within the annular heating zone may be surmounted by a structure having a plurality of outwardly extending fins. The fins are configured to extend into the supply chamber which supplies particulate material to the heating zone. The fins are of metallic construction and are heated through conduction by the heated walls of the spacing member. The fins transfer heat into the particulate material within the supply chamber and thus function as a preheat means. Similar fins may extend into the supply chamber from the vessel wall.

Carbon may be reactivated effectively in the kiln a about 1200° F. with a residence time of between about ¼ to about ½ hour. The heating zone remains stationary (except for expansion) during operation. Accordingly, the apparatus of this invention may be regarded as a "static kiln".

The preferred embodiments of the kilns of this invention include an enclosure for the vessel described. This enclosure is structured to define a plenum which substantially surrounds the vessel wall as well as the supply chamber. The heating means, e.g. electric coils, are positioned within this plenum. As power is supplied to the coils, the vessel wall and the supply chamber are heated by convection as well as by radiation. The specific placement of the heating elements within the plenum depends upon the amount of heat required and the temperature gradients either tolerable or desired as the particulate material migrates down through the heating zone. Large gradients are readily avoided. Typically, the coils are located in the lower portion of the plenum, proximate the lower region of the vessel wall. In that case, the lower region naturally absorbs more heat than either the upper region of the vessel wall or the supply chamber. The heated vessel wall transfers heat to the particulate material within the heating zone. The heated particulate material, in turn, transfers heat to the spacing member. Because the lower region of the vessel wall obtains the highest heat absorption, the lowermost section of the spacing member is consequently also heated most. Due to the high heat conductivity of these metallic structures, heat is readily transferred upward along the height of the annular heating zone. This phenomenon permits the spacing member to actually heat the particulate material proximate its upper portion as opposed to absorbing heat from the particulate material as occurs in the lower section of the heating zone. It is within contemplation to place a heat source within the spacing member (core) itself to hold the temperature of the inner wall of the annular heating zone to the desired level. As mentioned previously, the uppermost region of the inner and outer walls of the heating zone may be fitted with a plurality of fins which provide an expanded heat transfer surface area for purposes of transferring heat from the spacing member and vessel wall into the particulate material resident within the kiln's supply chamber.

Although a variety of expedients are practical for introducing feed material to the top of the vessel, it is often desirable to associate the kiln with structure adapted to preheat and/or dry this material prior to its introduction to the supply chamber. In many cases, substantially over half of the total heat requirement for the reactivating of carbon is associated with the removal of excess moisture from the feed material. Various hopper and conveyor arrangements are within contemplation.

Certain embodiments of this invention include a transition chamber between the supply chamber and a stack. The transition chamber serves to collect moisture and gasses driven from the particulate material as it is dried and/or reactivated. Particulate material may be introduced to the supply chamber through the transition chamber. It is often desirable to burn or otherwise treat the gasses collected by the transition chamber prior to passing them to a stack for emission into the atmosphere. The heat generated in this way can be utilized for drying the particulate feed material. By conduction or other heat transfer expedients, the temperature in the supply chamber can be maintained appreciably higher (e.g., 1300°–1500° F.) than would otherwise result by means of heat transfer from the heating zone.

DESCRIPTION OF THE DRAWINGS

In the drawings, which illustrate that which is presently regarded as the best mode for carrying out the invention.

DETAILED DESCRIPTION OF THE ILLUSTRATED EMBODIMENT

Figure 1:
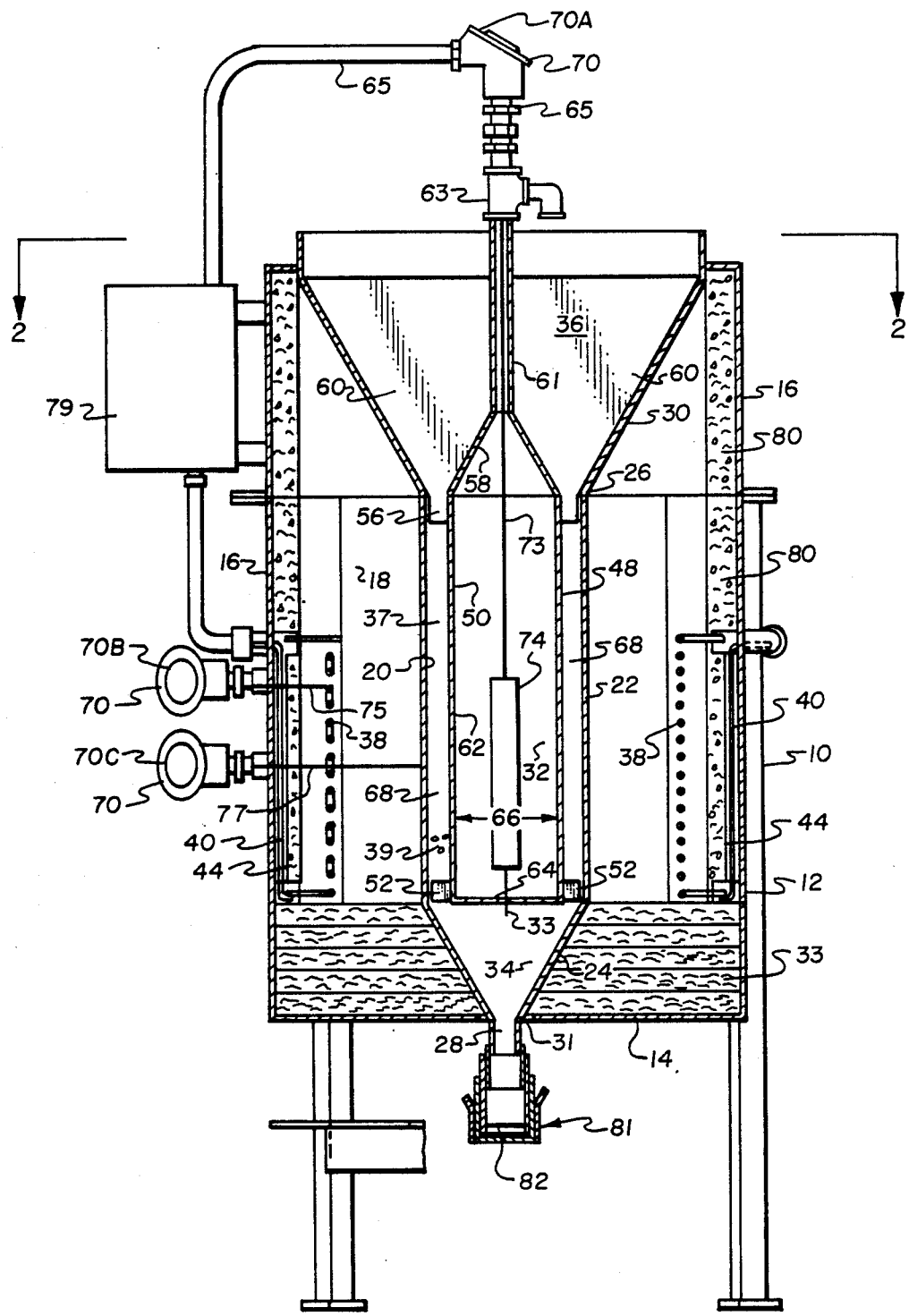
FIG. 1 is a view in side elevation, partly in section, illustrating one embodiment of a static kiln of this invention.
Figure 2:
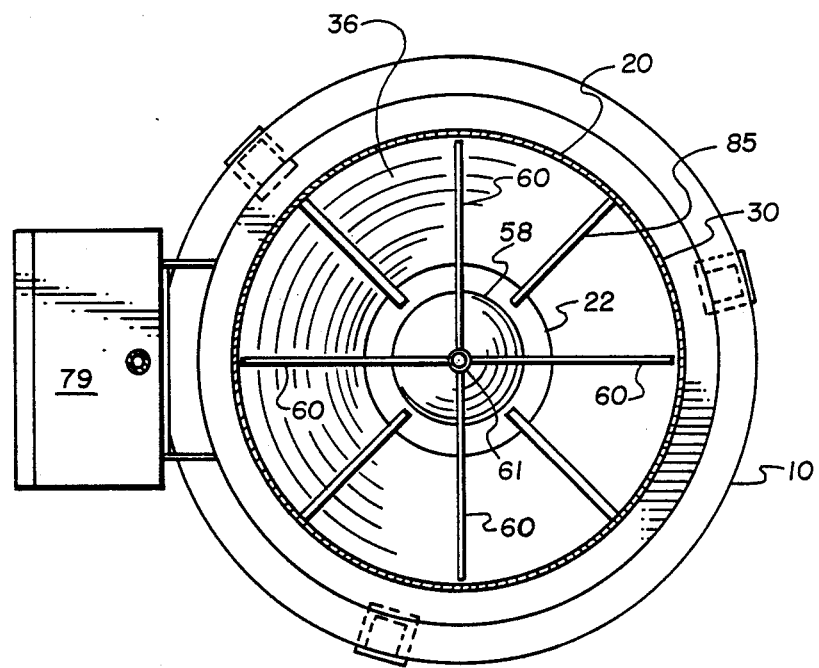
FIG. 2 is a view of the apparatus of FIG. 1 in cross-section, taken at the reference line 2—2 of FIG. 1, viewed in the direction of the arrows.

FIG. 1 of the drawings illustrates a static kiln of this invention designated generally 10. The kiln 10 includes an outer enclosure 12 which is formed of metal. Enclosure 12 is hollow and cylindrical in shape, and includes a planar, circular shaped floor 14 surmounted by an upwardly extending annular sidewall 16. Floor 14 and sidewall 16 are sealedly mounted one to the other to form an airtight association.

Positioned within the hollow interior 18 of enclosure 12 is a hollow vessel 20. The vessel 20 is formed of an annular metallic wall 22 which presents an open-ended cylindrical configuration. The bottom of vessel 20 is fitted with a funnel extension 24 which is likewise hollow. Funnel extension 24 presents the appearance of an inverted, truncated cone. Extension 24 and vessel 20 are unitary or bonded one to another in sealed relation. Both the extension 24 and the vessel 20 are formed of solid walls, i.e. these two structures do not include perforations within their walls. As a result, once material is introduced into the top of vessel 20, that material can only exit either through the open top 26 of vessel 20 or alternatively through the open port 28 formed in the apex region of extension 24.

The open top 26 of vessel 20 is fitted with an inlet funnel 30 which, similarly to extension 24, is configured in the shape of an inverted truncated cone. This funnel 30 defines a supply chamber for the kiln. Funnel 30 is formed of a solid sidewall and is sealedly mounted to the vessel 20 about its open end 26. The funnel 30 is positioned with respect to the sidewall 16 at its upper end to effect a seal. The funnel extension 24 is suspended through a hole 31 in the floor 14. Insulation 33 such as the layers of board-type ceramic insulation shown, occupies the bottom portion of the enclosure 12. This insulation 33 is compressed by the weight of the vessel 20, thereby to effect a seal of the hole 31 between the extension 24 and the floor 12. This arrangement permits free expansion and contraction of the walls of the vessel 20 without the development of compressive forces. The metal walls of the vessel 20 are in tension at all times. Due to the sealed relationship of the funnel extensions to the enclosure 12, and the solid wall construction of the vessel 20 and the two funnel extensions, the interior 18 of the enclosure 12 is effectively sealed from contact with material or gasses residing within the interior 32 of the vessel 20 in the respective interiors 34 and 36 of the two funnel extensions 24 and 30.

Positioned within the interior 18 of enclosure 12 is a plurality of electrically powered heating coils 38. These coils are shown in a generally annular shape, whereby they may be positioned to encircle the vessel 20. As shown in FIG. 1, the coils 38 are mounted proximate the lower region of the vessel 20. If needed, coils 38 may be positioned along the entire height of the vessel 20. The coils 38 are fitted with wire circuitry 40 adapted to permit a variable power supply to the coils 38 and thereby facilitate a control of the coil temperature. As shown, the circuitry is insulated by sheathing 44, which is adapted to preclude heat damage to the circuitry.

Figure 3:
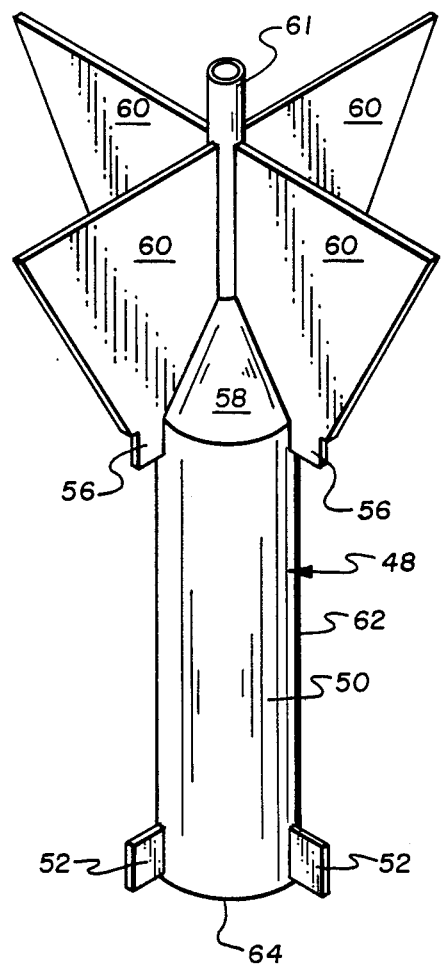
FIG. 3 is an elevational view of the central core (spacing member) element of the kiln.

A core, i.e. impermeable spacing member 48, is suspended within the interior 32 of vessel 20. FIG. 3 illustrates this spacing member 48 in detail. Spacing member 48 includes a cylindrically shaped section 50, a plurality of lower spacing members 52, a plurality of upper spacing members 56, a cone-like closing member 58 and a plurality of fins 60. As illustrated, each fin 60 is integral with an upper spacing member 56. The upper 52 and lower 56 spacing members serve to retain the core 48 in approximately vertical and axial alignment within the interior 32 of vessel 20. The spacing members 52, 56 retain proper alignment of the core 48 despite the relative movement of the core 48 with respect to the vessel 20 as those two structures expand or contract.

Section 50 is a hollow metallic member having generally right cylinder appearance. The sidewalls 62 of section 50 as well as the circular, planar end 64 of section 50, are formed of solid walls. The diameter 66 of the section 50 is dimensioned to be less than the diameter of the interior 32 of vessel 20, whereby upon the placement of the section 50 within the interior 32, an annular upright channel 68 is formed between the vessel 20 and the section 50 in that both the vessel 20 and the section 50 are configured as right cylinders. The dimensions of the annular channel 68 remain substantially constant over the entire height of the channel. The section 50 is formed of a metal which permits a high rate of heat transfer through the body of the section.

As shown in FIGS. 1 and 3, the upper spacing members 52 are thin planar panels which extend outward from the section 50. The spacers are oriented vertically such that the profile of each spacer as viewed from above, e.g. from the direction of fins 60, is minimized. The minimized profile is desirable in that particulate material processed by the kiln flows downward through channel 68. The spacers, being positioned within that channel, offer a potential obstruction to that flow. Therefore, in preferred embodiments, relatively few (typically 3 or 4) supports 52 are used.

Upper spacing members 56 are similar in construction to the lower spacing members 52. Members 56 are positioned proximate the upper region of the section 50 and extend outwardly therefrom. They are thin planar panels dimensioned to extend outward to nearly contact the sidewalls of vessel 20. Members 56 also are positioned within channel 68 and therefore are preferably oriented upright to minimize their obstructing flow in the channel 68. Although the members 52 and 56 may be fixed, e.g. by welded attachment, to a side wall of the core 48, the upper members are shown depending from fins 60.

A plurality of metallic support fins 60 is mounted on the core 58 and on extension 61 of the core. Each fin 60 is a planar panel, oriented vertically upright. The fins 60 are adapted to receive heat absorbed by section 50 and direct that heat into the particulate material residing within the conical supply chamber interior 36.

The kiln may be equipped with a plurality of temperature monitoring apparatus 70. In a typical embodiment this apparatus 70 may be conventional thermocouples. A first thermocouple 70A is positioned over and above the heating zone 37 of the kiln. It is adapted to measure the temperature of the particulate material 39 being processed within heating zone 37. First thermocouple 70A includes sensors 73 which extend through the core extension 61 and into the hollow interior of spacing member (core) 48. The sensors 73 may be extended through apertures within the solid wall of spacing member 48. The sensors 73 may be positioned in a variety of locations depending on where temperature measurement is desired. For example, the sensors 73 may be positioned along the height of sectional member 50 or alternatively the sensors 73 may be extended through the floor 64 of spacing member 48 whereby the temperature of the particulates emerging from the heating zone may be measured.

Alternately, the sensor 73 may serve as a temperature limit sensor for a heating element 74 suspended within the core 48. Thermocouple 70B may include sensors 75 which are positioned on or near the surface of one of the coils 38. Thermocouple 70B may thus be used to monitor and control the surface temperature of the coils 38.

Thermocouple 70C includes sensors 77 which extend into the hollow interior space 18. In one embodiment, these sensors are positioned on or near the wall 22 defining the heating zone 37 and thus can be utilized to monitor and control the temperature of that wall.

The thermocouples may each be connected into an electronic control panel 79 which is adapted to receive the readings of the various thermocouples and control the flow of electricity to the coils to maintain the desired temperature conditions within the heating zone 37. The annular wall 22 in association with the spacing member defines a heating zone 37 therebetween.

Ceramic wool insulation 80 is positioned as needed to prevent heat loss from the kiln.

Various discharge mechanisms which monitor or control the discharge rate through the discharge port 28 are within contemplation. The device 81 illustrated mechanically disturbs the angle of repose of material collecting on a bottom plate 82. The rate of discharge can be precisely controlled within wide limits by this means.

Referring to FIG. 3, a plurality of radial vanes 85 are shown projecting in and from the wall 30 of the vessel 20. These vanes 85 are analogous to the fins 60 and serve to carry heat from the wall 30 to the interior of the supply chamber 36.

Reference herein to details of the illustrated embodiments is not intended to restrict the scope of the appended claims.

We claim:
1. A kiln comprising:
a metallic vessel having an inner wall which substantially surrounds an interior space and thereby defines a heating zone;
heating means for heating said inner wall to a selected temperature below the softening point of said inner wall;

a spacing member mounted within said interior space, said spacing member in association with said inner wall defining an approximately annular heating zone therebetween;

means for introducing particulate material to the top of said vessel and for discharging said material from the bottom of said vessel wherein the material introduced to the top migrates down through the heating zone during a selected residence time;

wherein said spacing member is mounted to permit its upward as well as downward movement within said interior space in response to thermal expansion or contraction.

2. The kiln according to claim 1 wherein said heating means include a plurality of electrically powered heating coils arranged within said vessel about said inner wall.

3. The kiln according to claim 2 wherein said heating coils extend from proximate a bottom of said interior space upwards approximately two-thirds a height of said interior space.

4. The kiln according to claim 1 wherein said spacing member includes a plurality of fins mounted proximate a top thereof, said fins being adapted to transmit heat from said spacing member into particulate material positioned proximate said top of said vessel prior to said particulate material's introduction into said heating zone.

5. The kiln according to claim 4 including a plurality of fins extending from said inner wall constituting means for transmitting heat from said inner wall into said particulate material.

6. The kiln according to claim 1 wherein said inner wall is suspended to permit expansion downward in response to thermal expansion.

7. The kiln according to claim 1 wherein said spacing member includes a plurality of extension members mounted thereon to extend outwardly, said extension members being positioned to rest on said wall to support said spacing member in an upright orientation within said interior space.

8. A kiln comprising:

a metallic enclosure having an outer wall an inner wall, said outer wall and inner wall defining a hollow enclosed chamber, said inner wall defining an inner space having the shape of an inverted truncated cone set atop a substantially upright cylinder;

a plurality of electrically heating coils positioned within said chamber;

a central core suspended within said inner space, said core including a cylindrical section, a plurality of first spacing members extending outward from a lower portion of said cylindrical section, and a plurality of second spacing members extending outward from a upper portion of said cylindrical section, said first and second spacing members constituting means for maintaining said core approximately vertical within said inner space, a plurality of planar fins mounted atop said cylindrical section and dimensioned to extend outward into said truncated cone section of said inner space; the association of said cylindrical region with said inner wall defining an annular heating zone;

said inner space including a first preheat zone proximate its top for introducing particulate material into said heating zone, said inner space also including a port proximate its bottom for discharging material from said heating zone;

said heating coils being adapted for heating said inner wall and indirectly heating said core whereby heat is transmitted from said core into said fins providing thereby a preheating of particulate material residing within said truncated cone-like section of said inner space prior to said particulate material's introduction into said annular heating zone;

wherein said core is adapted to be displaceable vertically within said inner space in response to thermally induced expansion or contraction.

9. The kiln according to claim 8 wherein a plurality of radial fins extend inward from said inner wall into said truncated cone-like section whereby to transmit heat from said inner wall to particulate material within said truncated cone-like section.

10. The kiln according to claim 8 wherein said cylindrical region of said core includes a plurality of second support extension which extend outwardly from said spacing member towards said inner wall, thereby stabilizing said core within said inner space in an upright orientation.

11. The kiln according to claim 8 wherein said cylindrical section of said core is approximately equal in height to the height of said cylindrical region of said inner space.

* * * * *